United States Patent [19]

Egawa

[11] Patent Number: 4,937,834
[45] Date of Patent: Jun. 26, 1990

[54] HIGH-FREQUENCY DISCHARGE PUMPING LASER DEVICE

[75] Inventor: Akira Egawa, Yamanashi, Japan

[73] Assignee: Fanuc Ltd., Minamitsuru, Japan

[21] Appl. No.: 329,790

[22] PCT Filed: Jul. 15, 1988

[86] PCT No.: PCT/JP88/00710

§ 371 Date: Mar. 13, 1989

§ 102(e) Date: Mar. 13, 1989

[87] PCT Pub. No.: WO89/00776

PCT Pub. Date: Jan. 26, 1989

[30] Foreign Application Priority Data

Jul. 17, 1987 [JP] Japan .............................. 62-178571
Jul. 17, 1987 [JP] Japan .............................. 62-178572

[51] Int. Cl.$^5$ ............................................. H01S 3/00
[52] U.S. Cl. ......................................... 372/38; 372/62; 372/82
[58] Field of Search .................. 372/64, 87, 82, 86, 372/38, 62

[56] References Cited

U.S. PATENT DOCUMENTS

| | | |
|---|---|---|
| 4,169,251 | 9/1979 | Laakmann .............................. 372/64 |
| 4,352,188 | 9/1982 | Griffith .................................. 372/82 |
| 4,373,202 | 2/1983 | Laakmann et al. ................... 372/64 |
| 4,493,087 | 1/1985 | Laakman et al. ...................... 372/64 |
| 4,494,236 | 1/1985 | Sutter, Jr. .............................. 372/25 |
| 4,618,961 | 10/1986 | Sutter, Jr. .............................. 372/87 |
| 4,887,773 | 6/1989 | Wakata et al. ......................... 372/86 |

FOREIGN PATENT DOCUMENTS

| | | | |
|---|---|---|---|
| 2805503 | 8/1978 | Fed. Rep. of Germany ........ 372/88 |
| 0152189 | 7/1987 | Japan ..................................... 372/61 |

*Primary Examiner*—Léon Scott, Jr.
*Attorney, Agent, or Firm*—Staas & Halsey

[57] ABSTRACT

A high-frequency discharge pumping laser device is provided, applying a high-frequency voltage to a laser tube to produce laser oscillation. The high-frequency discharge pumping laser device comprises a high-frequency power supply for generating the high-frequency voltage, and a matching circuit for gaining impedance matching between the high-frequency power supply and the laser tube. The matching circuit has a reactance having an intermediate point connected to ground of a high-frequency circuit. This arrangement reduces variations or fluctuations of the laser output due to a mutual current and a mutual impedance between discharge tube segments.

15 Claims, 11 Drawing Sheets

4,937,834

HIGH-FREQUENCY DISCHARGE PUMPING LASER DEVICE

BACKGROUND OF THE INVENTION

The present invention relates to a high-frequency discharge pumping laser device for producing a high-power laser beam for cutting workpieces of metal, or the like, and more particularly to a high-frequency discharge pumping laser device capable of stable high-frequency discharge pumping.

High-frequency discharge pumping axial-flow $CO_2$ lasers are finding wide use because of their advantages of high-power output and stable oscillation.

A conventional axial-flow-type high-frequency discharge pumping laser device is illustrated in FIG. 9 of the accompanying drawings. The illustrated laser device includes a discharge tube 1 having four tube segments. However, the discharge tube 1 may have any desired number of tube segments dependent on the output to be produced. A total reflection mirror 2 and an output coupling mirror 3 are accurately positioned at the ends of the discharge tube 1. Denoted at 4 is an outgoing laser beam. The segments of the discharge tube 1 have gas inlet and outlet ports connected to a single roots blower 7. Cooling units 5, 6 serve to cool a laser gas heated by the discharge and the roots blower 7. The laser gas flows in the discharge tube 1 and gas delivery tubes in the directions of the arrows. Electrodes $8a$, $8b \sim 11a$, $11b$ are connected to respective high-frequency power supplies 12, 13, 14, 15. The gas flows in the discharge tube 1 at the speed of about 100 m/second. An electric discharge is produced in the discharge tube 1 by a high-frequency voltage applied by the high-frequency power supplies $12 \sim 15$ to generate laser oscillation.

The circuit arrangement of one discharge tube segment of the conventional high-frequency discharge pumping laser device is shown in FIG. 10. Denoted at 12 is a high-frequency power supply, and 16 a matching circuit for gaining impedance matching between the high-frequency power supply 12 and the discharge tube 1. The output terminals of the high-frequency power supply 12 are coupled to the electrodes $8a$, $8b$ of the discharge tube 1 through the matching circuit 16, the electrode $8b$ being grounded.

With such a high-frequency discharge pumping laser device, however, the laser output varies in cyclic periods of about several Hz. Such a laser output fluctuation is illustrated in FIG. 11, with the horizontal axis indicating time and the vertical axis the laser output. As shown in FIG. 11, a laser output fluctuation having the magnitude of about 40 W is produced for a laser output of about 800 W.

SUMMARY OF THE INVENTION

It is an object of the present invention to provide a high-frequency discharge pumping laser device which will solve the above problem and is capable of stable high-frequency discharge pumping.

To solve the above problem, there is provided a high-frequency discharge pumping laser device for applying a high-frequency voltage to a laser tube to produce laser oscillation, including:

a high-frequency power supply for generating the high-frequency voltage; and a matching circuit for gaining impedance matching between the high-frequency power supply and the laser tube, said matching circuit having a reactance having an intermediate point connected to ground of a high-frequency circuit.

There is also provided a high-frequency discharge pumping laser device for applying a high-frequency voltage to a laser tube to produce laser oscillation, including:

a high-frequency power supply for generating the high-frequency voltage; and a matching circuit for gaining impedance matching between the high-frequency power supply and the laser tube, said matching circuit being a balanced circuit, and said matching circuit being isolated from said high-frequency power supply in a DC fashion and not connected to ground of a high-frequency circuit.

The aforesaid problem arises from a mutual current due to a gas flow between discharge tube segments, and a current due to a mutual impedance of supports supporting the discharge tube segments.

According to the several embodiments of invention, the influences of the mutual current and the mutual impedance are eliminated by grounding the intermediate point of the matching circuit.

According to the alternate embodiment, the influences of the above currents are eliminated by isolating the matching circuit from the high-frequency power supply in a DC manner.

DETAILED DESCRIPTION OF THE PREFERRED EMBODIMENTS

Embodiments of the present invention will hereinafter be described in specific detail with reference to the drawings.

Figure 7:
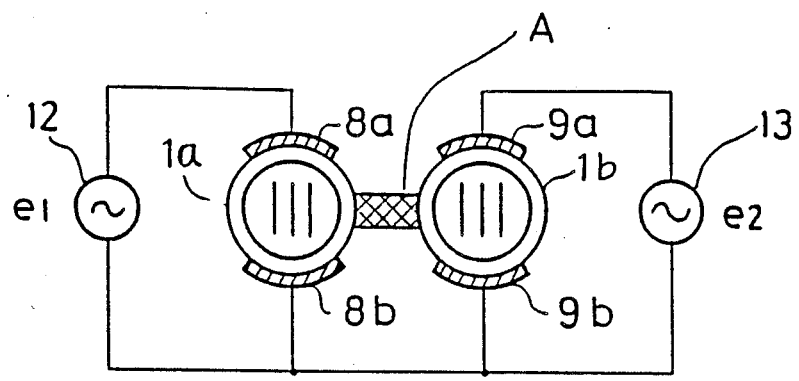
FIG. 7 is a diagram illustrating an electric current between discharge tube segments.

First, interference between discharge tube segments will be described. For the sake of brevity, the discharge tube segments each having two electrodes will be described. FIG. 7 illustrates an arrangement used to explain an electric current between the discharge tube segments. Designated at $1a$, $1b$ are discharge tube segments having electrodes 8a, 8b and 9a, 9b, respectively, to which high-frequency e1, e2 are applied by high-frequency power supplies 12, 13, respectively. The reference character A represents a mutual current due to a gas flow between the dicharge tube segments 1a, 1b and an impedance of a support supporting the discharge tube 1.

Figure 8:
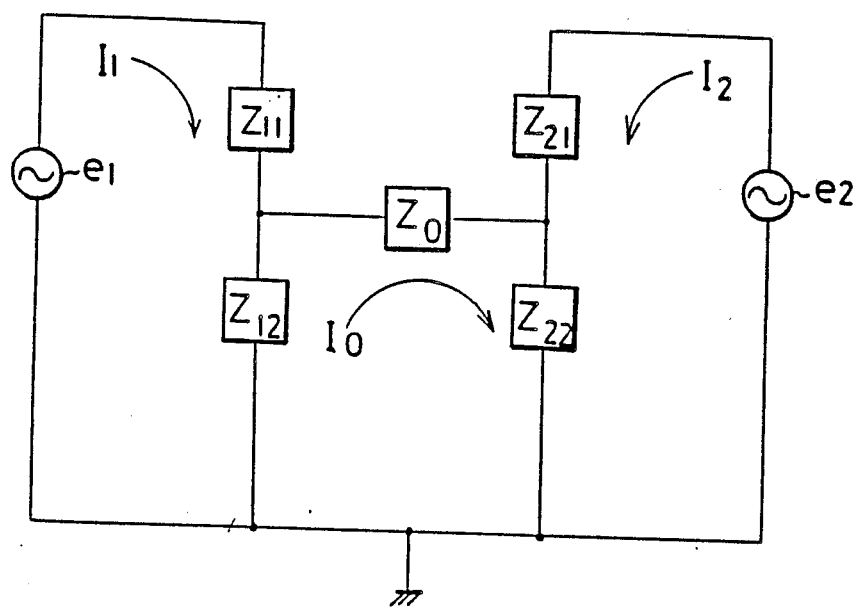
FIG. 8 is a diagram of an equivalent circuit of the arrangement shown in FIG. 7.
Figure 9:
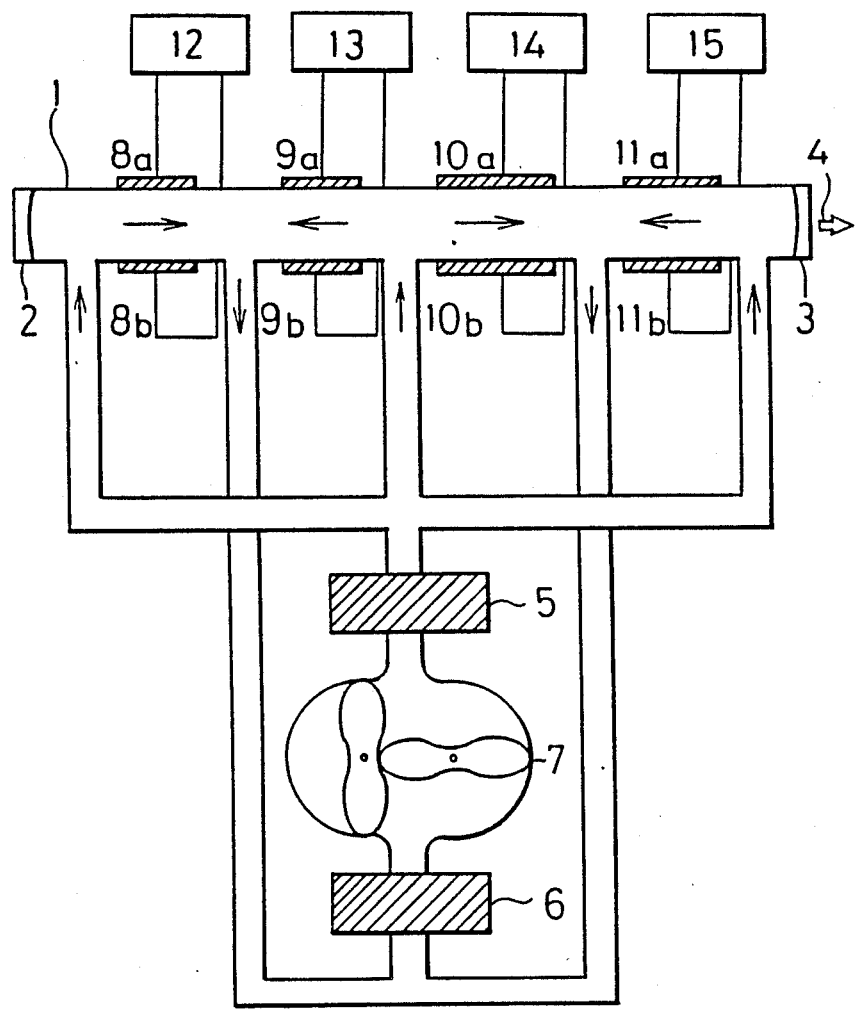
FIG. 9 is a view showing a conventional axial-flow high-frequency discharge pumping laser device.
Figure 10:
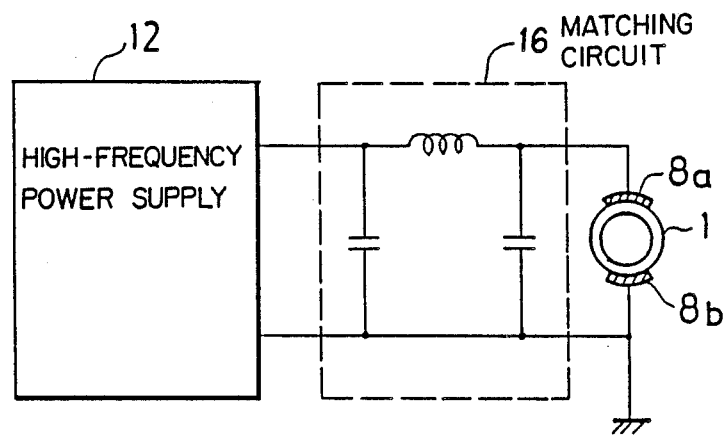
FIG. 10 is a block diagram of the circuit arrangement of a single discharge tube segment of the conventional high-frequency discharge pumping laser device.

An equivalent circuit of the arrangement of FIG. 7 is shown in FIG. 8. Denoted at $I_1$ is a circuit current from the high-frequency power supply 12 shown in FIG. 7, $I_2$ a circuit current from the high-frequency power supply 13 of FIG. 7, and $I_0$ a mutual current between the circuits coupled to the power supplies 12, 13. Designated at $Z_o$ is a mutual impedance including both a current due to the gas flow and a high-frequency current due to the impedance of the support supporting the discharge tube 1, $Z_{11}$, $Z_{12}$ two equal impedances into which the impedance of the discharge tube segment 1a is divided, and $Z_{21}$, $Z_{22}$ two equal impedances into which the impedance of the discharge tube segment 1b is divided. Assuming that the voltage and the angular frequency of the high-frequency power supply 12 are indicated by e1 and $\omega_1$, respectively, and the voltage and the angular frequency of the high-frequency power supply 13 are indicated by e2 and $\omega_2$, respectively, with these voltages being expressed by:

$$e1 = E_1 \sin \omega_1 t$$

$$e2 = E_2 \sin \omega_2 t,$$

then the circuit current $I_1$ is given as follows:

$$I_1 = \sqrt{(Ima)^2 + (Imb)^2 + 2\, Ima\, Imb \cos \omega_3 t}$$
$$\times \sin\{\omega_4 t + \tan^{-1} k\}$$

where $$\omega_3 = |\omega_1 - \omega_2|$$
$$\omega_4 = (\omega_1 + \omega_2)/2$$
$$k = (Ima - Imb)/(Ima + Imb) \times \tan(\omega_1 - \omega_2)t/2$$
$$Ima = E_1\{(Z_{21} + Z_{22})(Z_{12} + Z_0) + Z_{21}Z_{22}\}/|Z|$$
$$Imb = -E_2 Z_{12} Z_{22}/|Z|$$

$$|Z| = \begin{vmatrix} Z_m & 0 & -Z_{12} \\ 0 & Z_n & Z_{23} \\ -Z_{12} & Z_{22} & Z_p \end{vmatrix}$$

$$Z_m = Z_{11} + Z_{12}$$
$$Z_n = Z_{21} + Z_{22}$$
$$Z_p = Z_{12} + Z_{22} + Z_0$$

Therefore, by grounding the intermediate point between the power supplies 12, 13, the following equation is obtained:

$$Imb = -E_2 Z_{12}(Z_{21} - Z_{22})/|Z|$$

Since $Z_{21}$ and $Z_{22}$ are generally equal to each other, $$Imb = 0,$$

and hence $$I_1 = Ima \sin \omega_1 t$$

$$Ima = E1/(Z_{11} + Z_{12})$$

Accordingly, interference between the discharge tube segments 1a, 1b can be prevented by connecting the intermediate point between the power supplies 12, 13 to ground.

As can be seen from the equivalent circuit to FIG. 8, the mutual current $I_0$ flows since the two circuits connected to the respective power supplies have a common grounding circuit. Therefore, the mutual current $I_0$ does not flow if the grounding circuit is disconnected. This can be achieved by isolating the discharge tube segments from the high-frequency power supplies in a DC manner.

Figure 1:
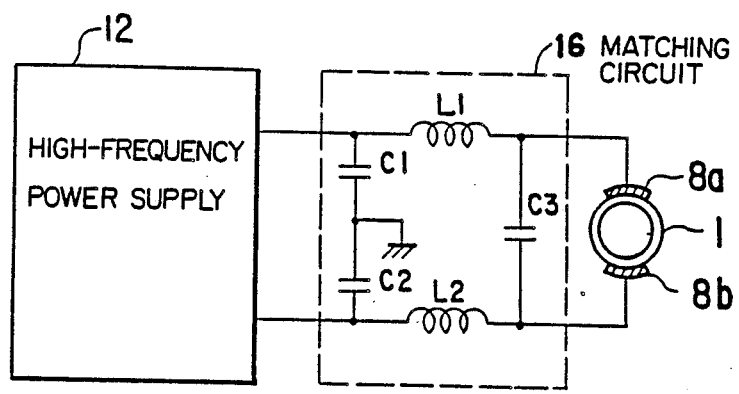
FIG. 1 is a block diagram of a first embodiment of the present invention.

FIG. 1 shows in block form a first embodiment of the present invention. In the first embodiment, the intermediate point of a high-frequency power supply is grounded.

Denoted at 12 is a high-frequency power supply, and 16 a matching circuit for gaining matching between the high-frequency power supply 12 and a discharge tube 1, the matching circuit 16 including inductances L1, L2 and capacitors C1, C2, C3. The matching circuit 16 is a balanced circuit as shown in FIG. 1. Designated at 8a, 8b are electrodes on the discharge tube 1.

As described above in detail, the intermediate point between the capacitors C1, C2 is grounded to prevent interference between the discharge tube segments. Since the matching circuit 16 is a balanced circuit, the same result can be achieved by grounding any point on the circuit insofar as the impedance is divided into two equal impedances as viewed from the discharge tube 1 toward the high-frequency power supply 12.

Figure 2:
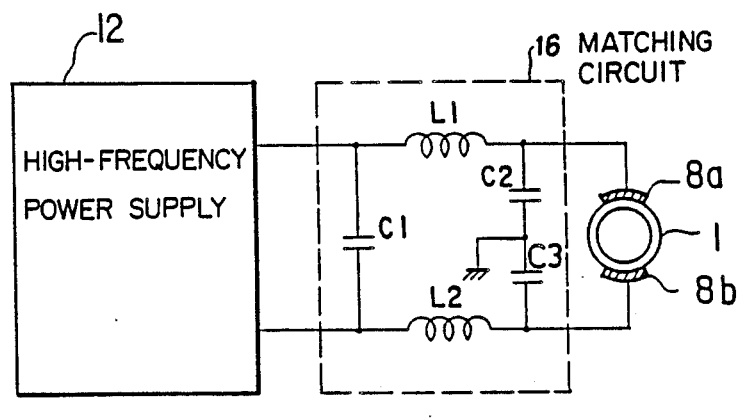
FIG. 2 is a block diagram of a second embodiment of the present invention.

FIG. 2 shows a second embodiment of the present invention, which differs from the first embodiment in that the output side of a matching circuit 16 is composed of two capacitors C2, C3. The intermediate point between the capacitors C2, C3 is grounded. As described above, since the matching circuit 16 is a balanced circuit, it can be grounded at either the input or output side thereof. Whether the input side or the output side of the matching circuit 16 is to be grounded may be determined dependent on the packaging conditions for the components of the laser device.

Figure 3:
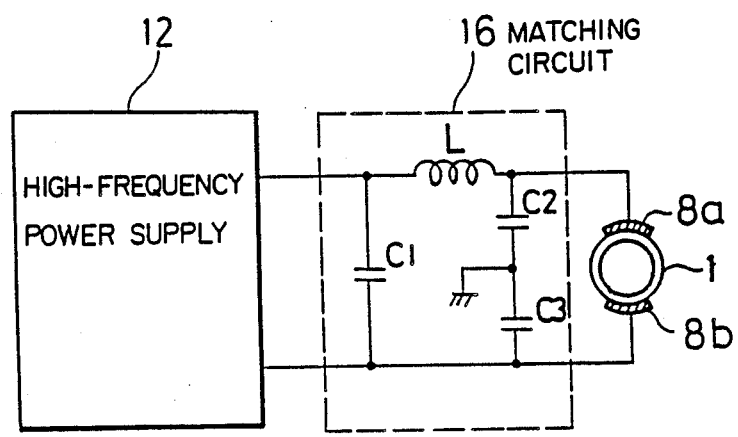
FIG. 3 is a block diagram of a third embodiment of the present invention.

FIG. 3 illustrates a third embodiment of the present invention. Denoted at 12 is a high-frequency power supply, and 16 a matching circuit for gaining matching between the high-frequency power supply 12 and a discharge tube 1, the matching circuit 16 comprising an inductance L and capacitors C1, C2, C3. Designated at 8a, 8b are electrodes on the discharge tube 1. As with the first and second embodiments, the intermediate point between the capacitors C1, C2 is connected to ground for preventing interference between the discharge tube segments. However, the matching circuit 16 is an unbalanced circuit.

Figure 4:
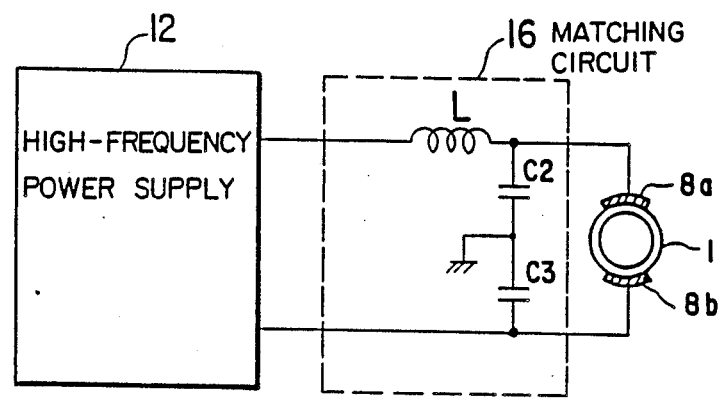
FIG. 4 is a block diagram of a fourth embodiment of the present invention.

A fourth embodiment shown in FIG. 4 differs from the embodiment of FIG. 3 in that a matching circuit 16 is of an inverted L-shaped configuration. The other details of the fourth embodiment are the same as those of FIG. 3.

Figure 5:
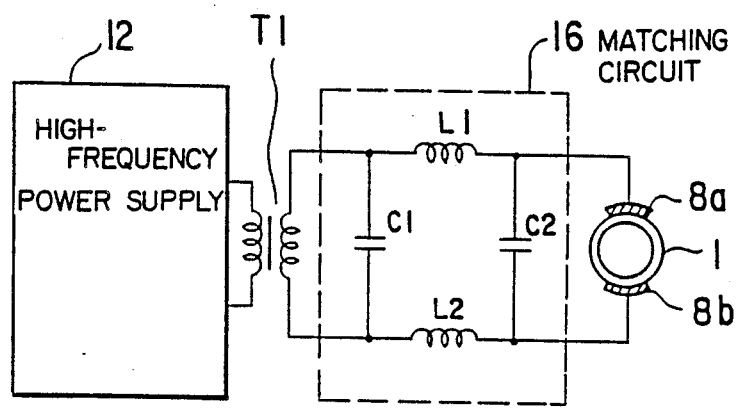
FIG. 5 is a block diagram of a fifth embodiment of the present invention.

According to a fifth embodiment shown in FIG. 5, a matching circuit is isolated from a high-frequency power supply in a DC fashion. Denoted at 12 is a high-frequency power supply, and 16 a matching circuit for gaining matching between the high-frequency power supply 12 and a discharge tube 1, the matching circuit 16 including inductances L1, L2 and capacitors C1, C2. An isolating transformer T1 isolates the high-frequency power supply 12 and the matching circuit 16 from each other in a DC manner. The matching circuit 16 is a balanced circuit as shown in FIG. 5. Designated at 8a, 8b are electrodes on the discharge tube 1, the electrode 8b being not grounded.

With this arrangement, there is no loop in which the mutual current $I_0$ described above with reference to FIG. 8 would flow, so that current interference between the discharge tube segments is prevented.

Figure 6:
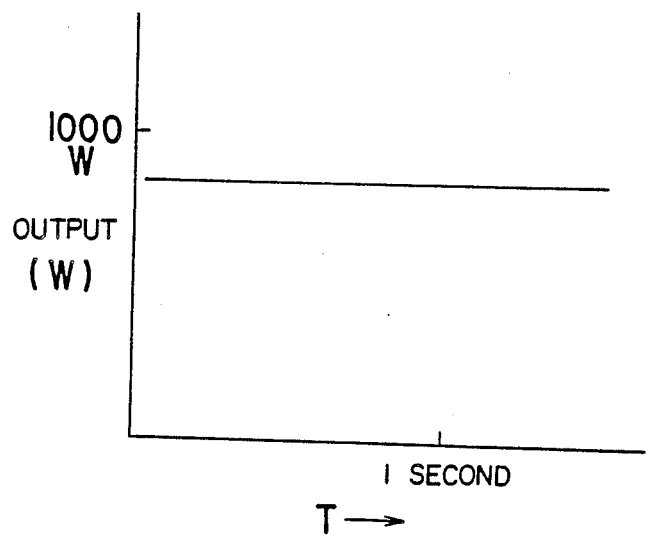
FIG. 6 is a diagram showing a fluctuation of the laser output according to the embodiments of the invention.
Figure 11:
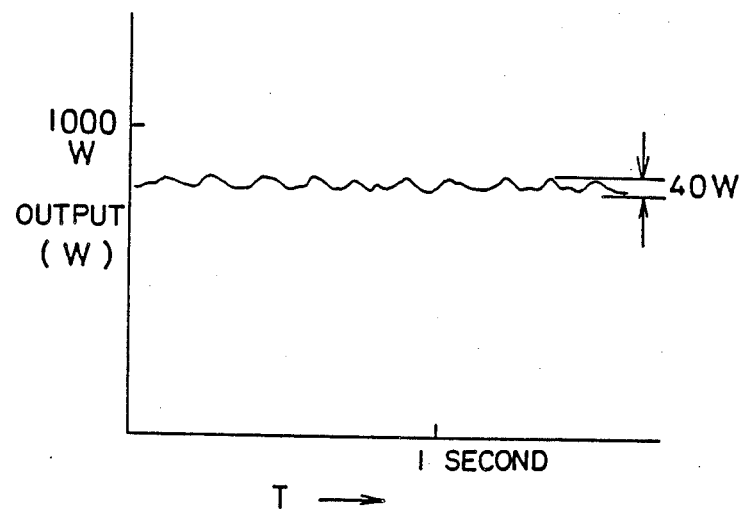
FIG. 11 is a diagram showing a fluctuation of the laser output of the conventional high-frequency discharge pumping laser device.

FIG. 6 is a graph showing the laser output produced by the arrangements illustrated in FIGS. 1, 2, 3, and 4. The graph has a horizontal axis representative of time and a vertical axis of the laser output. As shown in FIG. 6, any variation or fluctuation at the laser output of about 800 W has a magnitude of 10 W or less. Therefore, the laser output fluctuation is reduced as compared with the conventional laser output variation shown in FIG. 11.

Substantially the same advantage as that shown in FIG. 6 is obtained by the embodiment of FIG. 5.

According to first to fourth embodiments, as described above, since the intermediate point of the reactance is grounded, interference between the discharge tube segments is eliminated, thus greatly reducing variations or fluctuations of the laser output.

According to the fifth embodiment, the matching circuit is isolated from the high-frequency power supply in a DC manner to prevent a current from flowing between the discharge tube segments. Consequently, any interference between the discharge tube segments is eliminated. The fifth embodiments therefore offers the same advantage as that of the first to fourth embodiments.

I claim:

1. A high-frequency discharge pumping laser device for applying a high-frequency voltage to a plurality of laser discharge tube segments to produce laser oscillation, comprising:
a high-frequency power supply for generating the high-frequency voltage; and
a matching circuit for gaining impedance matching, said matching circuit having a reactance with an intermediate point connected to ground of a high-frequency circuit,
wherein the connection of said intermediate point to ground enables isolation of the discharge tube segments from the high-frequency power supply in a DC manner and prevents interference between said tube segments, to thereby reduce variations or fluctuations of an output of the laser.

2. A high-frequency discharge pumping laser device according to claim 1, wherein said matching circuit is a balanced circuit, the intermediate point of the reactance of said matching circuit as viewed from said discharge tube being connected to ground of the high-frequency circuit.

3. A high-frequency discharge pumping laser device according to claim 1, wherein said reactance comprises a capacitor.

4. A high-frequency discharge pumping laser device for applying a high-frequency voltage to a plurality of laser discharge tube segments to produce laser oscillation, comprising:
a high-frequency power supply for generating the high-frequency voltage; and
a matching circuit for gaining impedance matching, said matching circuit being a balanced circuit, being isolated from said high-frequency power supply in a DC fashion, and not connected to ground of a high-frequency circuit,
wherein the isolation of the matching circuit from the high frequency power supply in a DC manner prevents a current from flowing between the tube segments and eliminates interference between the tube segments to thereby reduce variations or fluctuations of an output of the laser.

5. A high-frequency discharge pumping laser device according to claim 4, wherein said matching circuit is isolated from said high-frequency power supply by a high-frequency isolating transformer.

6. A high-frequency circuit for use in a high frequency discharge pumping laser device having a plurality of laser tube segments, comprising:
(a) means for generating a high frequency voltage;
(b) means for gaining impedance matching between the voltage generating means and the laser tube segments,
wherein said matching means includes a reactance; and
(c) a ground connected to an intermediate point of the reactance,
wherein connection of said intermediate point to ground enables an isolation of the tube segments from the means for generating a high frequency voltage in a D.C. manner and eliminates interference between said tube segments, to thereby reduce variations or fluctuations of an output of the laser.

7. The circuit as recited in claim 6, wherein the matching means is a balanced matching circuit including two inductances and first, second and third capacitors, the ground being connected between the first and second capacitors.

8. The circuit as recited in claim 6, wherein the matching means is a balanced matching circuit including two inductances and first, second and third capacitors, the ground being connected between the second and third capacitors.

9. The circuit as recited in claim 6, wherein the matching means is an unbalanced matching circuit including an inductance and first, second and third capacitors, the ground being connected between the second and third capacitors.

10. The circuit as recited in claim 6, wherein the matching means is an inverted L-shaped matching circuit including an inductance and two capacitors, the ground being connected between the capacitors.

11. The circuit as recited in claim 6, wherein a fluctuation of laser output at about 800 W is about at most 10 W.

12. A high-frequency circuit for use in a high-frequency discharge pumping laser device having a plurality of laser tube segments, comprising:
(a) means for generating a high frequency voltage;
(b) means for gaining impedance matching between the voltage generating means and the laser tube segments, the matching means being an ungrounded, balanced matching circuit; and
(c) DC means for isolating the voltage generating means from the matching circuit,
wherein the isolation of the matching circuit from the high frequency voltage in a DC manner prevents a current from flowing between the tube segments and eliminates interference between the tube segments to thereby reduce variations or fluctuations of an output of the laser.

13. The circuit as recited in claim 12, wherein the isolating means includes a high-frequency isolating transformer.

14. The circuit as recited in claim 13, wherein the matching circuit includes two inductances and two capacitors.

15. The circuit as recited in claim 12, wherein a fluctuation of laser output at about 800 W is about at most 10 W.

* * * * *